United States Patent [19]

Grutsch et al.

[11] 4,073,722
[45] Feb. 14, 1978

[54] PROCESS FOR THE PURIFICATION OF WASTE WATER

[75] Inventors: James F. Grutsch, Hammond; Russell C. Mallatt, Crown Point, both of Ind.; Benjamin F. Steely, Chicago Heights, Ill.

[73] Assignee: Standard Oil Company (Indiana), Chicago, Ill.

[21] Appl. No.: 657,497

[22] Filed: Feb. 12, 1976

Related U.S. Application Data

[63] Continuation-in-part of Ser. No. 401,652, Sept. 28, 1973, abandoned.

[51] Int. Cl.$^2$ .............................................. C02C 1/06
[52] U.S. Cl. ......................................... 210/5; 210/6; 210/16; 210/18; 210/49
[58] Field of Search ....................................... 210/4–7, 210/15, 18, 195 R, 195 S, 49, 50, 59, 63 R, 16

[56] References Cited

U.S. PATENT DOCUMENTS

| | | | |
|---|---|---|---|
| 2,196,840 | 4/1940 | Singleton | 210/18 |
| 2,477,815 | 8/1949 | Mallory | 210/6 |
| 3,220,945 | 11/1965 | Torpey | 210/6 |
| 3,271,304 | 9/1966 | Valdespino et al. | 210/15 |
| 3,547,814 | 12/1970 | McWhirter | 210/7 |
| 3,565,796 | 2/1971 | Levin | 210/15 |
| 3,617,539 | 11/1971 | Grutsch et al. | 210/18 |
| 3,664,951 | 5/1972 | Armstrong | 210/195 |
| 3,670,887 | 6/1972 | McWhirter | 210/7 |
| 3,707,464 | 12/1972 | Burry et al. | 210/66 |
| 3,763,039 | 10/1973 | Wilson | 210/18 |
| 3,964,998 | 6/1976 | Barnard | 210/7 |

*Primary Examiner*—Thomas G. Wyse
*Attorney, Agent, or Firm*—Frank J. Sroka; Arthur G. Gilkes; William T. McClain

[57] ABSTRACT

Disclosed is a continuous process for purifying contaminated waste water. First the water passes through an equalization zone including at least two separate compartments, in one of which the pH of the water is adjusted to a range of from about 6.5 to 9.5. The water flows through the separate compartments such that the concentration of contaminants in the water exiting the equalization zone will approach about constant concentration which changes only gradually even though influent contaminant concentration changes rapidly. Water in at least one compartment of the equalization zone is aerated so that the dissolved oxygen in the water is at least three parts of dissolved oxygen per million parts of water. Solids are skimmed from the surface of the water in the zone, and coagulant is added to the effluent water from the equalization zone so that colloidal particles in the water flocculate. The water from this equalization zone is then filtered to remove flocculated particles. The effluent from the filter will preferably have less than about ten parts of suspended solids per million parts of water and/or less than about ten parts of oil and grease per million parts of water. This effluent is aerated, preferably by aspiration, and is treated in a four stage biological treating zone. In the first stage, the water contacts an activated sludge which decontaminates the water by biodegrading contaminants. In the second stage, water from the first stage is clarified to separate suspended sludge particles from decontaminated water. The bulk of the separated sludge particles is recycled to the first stage, and the bulk of the clarified, decontaminated water is withdrawn. In the third stage, that portion of the separated sludge particles not recycled is concentrated by removing additional residual water. In the fourth stage, the concentrated sludge particles are digested. In accordance with an important feature of our invention, the water-sludge mix as it flows between the first and second stages is aerated by aspirating air into the water-sludge mix and then subjecting this mix to a high hydrostatic pressure. Preferably the sludge flowing between the second, third and fourth stages is also aerated. The water separated from the second stage is filtered to remove any minute suspended sludge particles which may be present. The preferred filter medium is sand or combinations of sand and coal, and may be followed by treatment with activated carbon. Interstage aeration is conducted at pressures above atmospheric. This ensures substantial transfer of oxygen to the water. Also, activated sludge from the third and fourth stages may be recycled to the activated sludge-water mixture that exited the first stage. The average age of the sludge in the system is greater than ten days. The dissolved oxygen concentration in the water flowing into the second stage clarifier is at least about five parts of dissolved oxygen per million parts of water.

74 Claims, 1 Drawing Figure

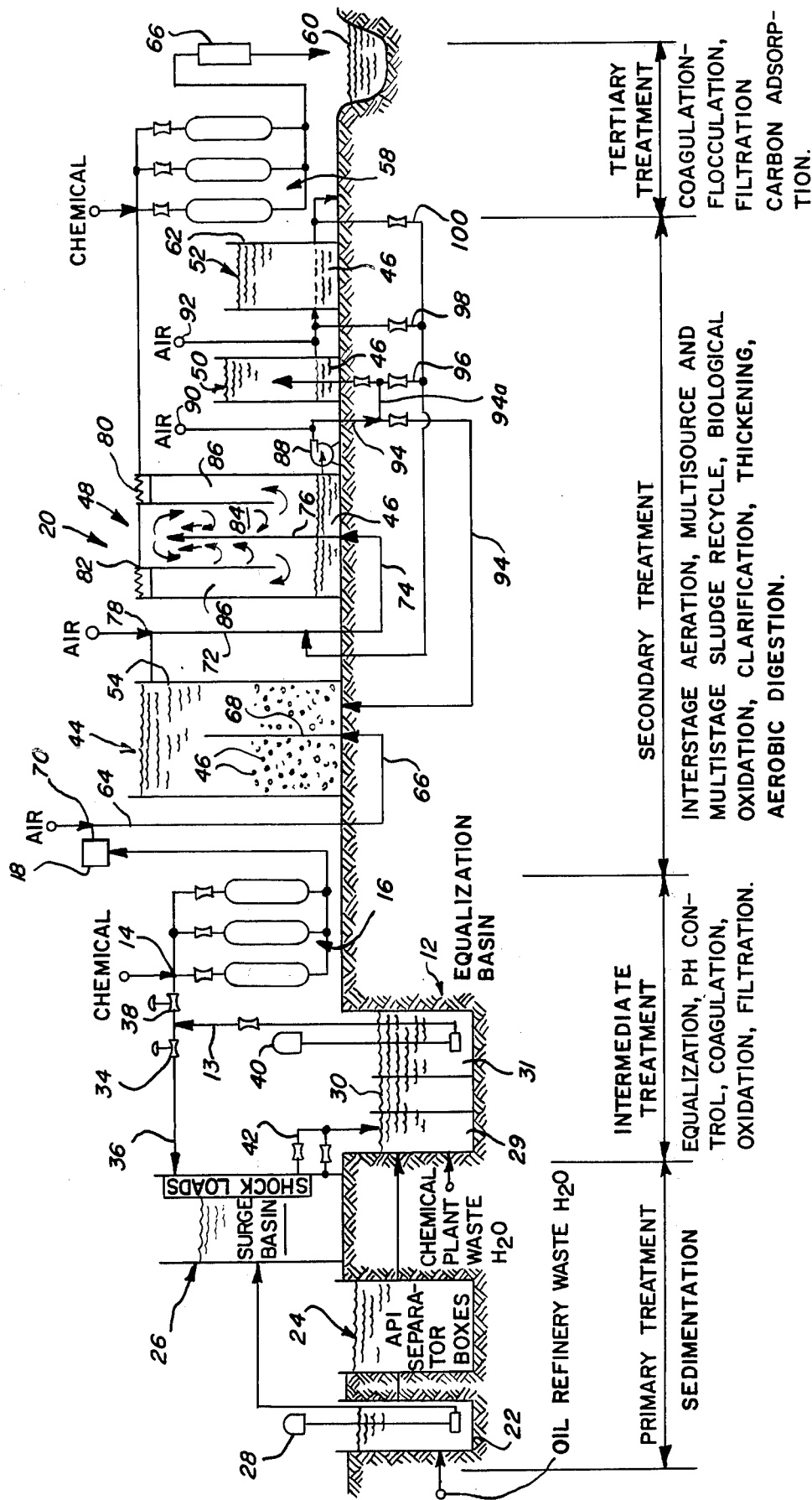

PROCESS FOR THE PURIFICATION OF WASTE WATER

RELATED APPLICATIONS

This application is a continuation-in-part of U.S. Ser. No. 401,652, filed Sept. 28, 1973, now abandoned.

BACKGROUND

The treatment of contaminated waste water from municipal or industrial sources involves a sequence of processing steps for maximizing water purification at minimum costs. Industrial effluents, particularly waste water from oil refineries, include a broad spectrum of contaminants, and, consequently, such waste water is usually more difficult to decontaminate than waste water from municipal sewage systems. Four main sequential process treatments are used to decontaminate such industrial effluents although similar treatment is given municipal effluents, or combined municipal/industrial effluents. These are a primary, intermediate, secondary, and tertiary treatments. The primary treatment calls for removal of gross amounts of oil and grease and solids from waste water. In the oil industry, usually separators of American Petroleum Institute design are employed for removal of free, separable oil and solids. In municipal waste water treatment, generally little free oil is present but solids removal is still needed. The intermediate treatment is the next process and it is designed to adjust water conditions so that the water entering the secondary treatment zone will not impair the operation of the secondary treatment processes. In other words, intermediate treatment is designed to optimize water conditions so that the secondary treatment process will operate most efficiently. The secondary treatment calls for biologically degrading dissolved organics and ammonia in the water. One of the most common biological treatment processes employed is the activated sludge process discussed below in greater detail. The tertiary treatment calls for removing residual biological solids present in the effluent from the secondary treatment zone and removing contaminants which contribute to impairing water clarity or adversely affecting water taste and odor. This is usually a filtration of the water, preferably through beds of sand, or combinations of sand and coal, followed by treatment with activated carbon.

The activated sludge process is a conventional waste water treating process which produces the highest degree of biological treatment in reasonably compact facilities at the present time. The application of this process to the treatment of industrial waste water has, however, been slow compared with municipal applications. Industrial applications of this process are nevertheless increasing rapidly. Currently, the activated sludge process is capable of achieving about 85% to 93% reduction in the five-day biological oxygen demand ($BOD_5$). However, the $BOD_5$ contaminants present in industrial waste water are relatively small compared with the total oxygen demanding contaminants present in such waste water as measured by the chemical oxygen demand (COD) test. For example, the $BOD_5$ contaminants present in the effluent from an activated sludge process typically ranges from 10 to 20 parts per million parts of water. It is not uncommon to also find present in such effluent 10 to 20 times this amount of COD.

The activated sludge process generally has four stages of treatment. In the first stage, contaminated water is contacted with the activated sludge. The sludge includes micro-organisms which feed on the contaminants in the water and metabolize these contaminants to form cellular structure and intermediate products. This decontaminated water flows into a second clarifier stage where suspended sludge particles are separated from the decontaminated water. A portion of the sludge is recycled to the first stage and the remainder is forwarded to the third and fourth stages. This sludge forwarded to the third and fourth stages includes water. In the third stage the sludge is thickened to remove excess water and in the fourth stage the thickened sludge is permitted to digest, that is, the micro-organisms feed upon their own cellular structure and are stabilized. Normally, the average age of these micro-organisms in the sludge is substantially less than ten days.

THE INVENTION

We have now invented an improved process for treating waste water including high and variable concentrations of $BOD_5$ contaminants, COD contaminants, oil and grease, inert solids, ammonia, phenolics, and other contaminants which are relatively refractory. Our process is adapted to treat waste water from municipalities and also waste water from oil refineries and chemical complexes where the water from the refining of oil is mixed with waste water from the chemical plants and waste water from combined municipal/industrial sources. As conventional, our process calls for primary, intermediate, secondary and tertiary water treatment. We have, however, made important and novel modifications in the intermediate and secondary treatments steps which result in substantial improvement in effluent water quality.

PRIMARY TREATMENT

As conventional, gross amounts of oil, grease and solids are removed from the oil refinery and/or chemical waste water by means of American Petroleum Institute separators. In treating municipal waste water, generally little oil is present but solids removal is carried out using clarifiers of conventional design. The effluent from this primary treatment typically includes from about 25 to about 150 parts of suspended solids per million parts of water and from about 25 to about 300 parts of oil and grease per million parts of water. In treating municipal waste, the oil level may be even lower. As is not commonly recognized, such waste water containing relatively large amounts of oil and/or solids, cannot be fed directly into an activated sludge process where the sludge age is in excess of about 10 days without upsetting the activated sludge process. Based on pilot plant studies and theoretical calculations, if the water entering the activated sludge process contains more than about twenty parts of solids per million parts of water and/or more than about twenty parts of oil and grease per million parts of water, downstream treatment is greatly impaired. In many cases, more than about ten parts per million of solids and/or about ten parts per million of hydrocarbon can be detrimental. Excessive amounts of oil and hydrocarbon can result in gross quantities of oily, emulsified material collecting in the first stage or mixed liquor tank of the activated sludge process. Such oily, emulsified solids impair or prevent the activated sludge from decontaminating the water, causing the effectiveness of the activated sludge process to be substantially diminished. In accordance with an important feature of our invention excessive oil and solids are removed from the waste water by our intermediate treatment.

INTERMEDIATE TREATMENT

Waste water is then subjected to intermediate treatment where excessive sollids and/or hydrocarbons are removed and contaminant concentrations are equalized so that such concentrations of contaminants remains more or less constant even though the contaminant concentration in the influent to the equalization treatment stage sharply changes from time to time. If waste water from a petroleum-chemical complex is being treated, it is desirable that the waste streams be combined and then subjected to intermediate treatment. If contaminant concentration in the influent changes and such change is sustained, this will ultimately result in a change in the contaminant concentration in the effluent from the equalization section. But because of the design of our equalization section, this change initially will occur gradually over a relatively long time interval. This permits the micro-organisms in the downstream activated sludge process to adapt or acclimate to this change in contaminant concentration while maintaining process purification efficiency.

In our process, intermediate treatment includes equalization and filtration. Equalization is conducted in a basin having two, preferably three or four compartments. These compartments are mixed and arranged in series so that water flows from one compartment to the next succeeding compartment. The total retention time of water in the basin is less than about 10 to 15 hours preferably 2 to 15 hours maximum. Consequently, heat loss is minimized. Normally, the difference in temperature between the influent and effluent water is 20° F or less. Preferably the retention time in each compartment is 30 to 90 minutes.

Waste waters from the various sources are mixed in the first compartment, and the contaminant concentration is monitored. Usually pH, toxic metals, COD contaminants, phenolic, and ammonia concentrations are measured either manually or automatically. Since waste waters from multiple sources are fed into the relatively confined space in the first compartment, several advantages occur. First it is easy to monitor contaminant concentration and readily detect any drastic change in concentration indicating, for example, a break in a chemical line. The reason is because the first compartment in a multiple compartment system will more rapidly increase in concentration to more readily detectable levels than a single compartment system. Also neutralization is achieved. For example, one source of water may be highly acidic and another highly basic. Neutralization occurs as these streams mix in the first compartment. Waste streams from municipal sources generally do not vary greatly in acid/basic content.

It is important to adjust the pH in the equalization basin in order to maximize oxidation of certain contaminants, particularly sulfides. pH is adjusted by adding acid or base to the water in the second compartment until the water has a pH ranging from about 6.5 to about 9.5, preferably between 7.5 and 8.5. Our experiments indicate that at least about three parts, preferably about five parts, of dissolved oxygen per million parts of water must be present to satisfy the immediate oxygen demand (IOD) of the contaminants in the water at a reasonable rate of oxidation. Preferably catalysts such as hydroquinone or gallic acid are added to the water to catalyze the oxidation of IOD contaminants. If this IOD is not satisfied, the downstream activated sludge process can be adversely affected. Consequently, the water in the equalization basin is aerated. Conventional floating aerators may be used. We have found that aeration is more effective in a confined zone. About 0.15 or more horsepower per thousand gallons of water provides excellent aeration. Aeration also thoroughly agitates and mixes the water with the result colloidal and suspended oils and solids are mechanically flocculated and accumulate on the water surface. These oily solids are removed by skimming. In order to ensure that the water to the activated sludge process includes less than about twenty parts of hydrocarbon, such as oil and grease, per million parts of water and/or less than about twenty parts of solids per million parts of water, we add a coagulating and/or flocculating agent to the water in the equalization basin or to the stream of water flowing to the activated sludge process. It is preferably to reduce the solids and/or hydrocarbon content of the waste water to less than about ten parts per million respectively. The coagulating and/or flocculating agent destabilizes colloidal particles which then aggregate. The aggregates are carried with the effluent stream to a filter and removed prior to introduction of the stream to the activated sludge process. We preferably introduce air into the stream of water flowing into the downstream activated sludge process to ensure that the immediate oxygen demand to the water is satisfied.

SECONDARY TREATMENT

In accordance with another feature of our invention water from intermediate treatment flows through a conventional activated sludge plant which has been modified in two important ways: (1) the sludge-water mix flowing between stages of activated sludge process is aerated, and (2) the sludge of different ages from different stages is recycled to one or more upstream stages of the activated sludge process. In our process, oxygen either pure or most preferably in air is introduced, for example pressurized or most preferably by aspiration into the stream of sludge and water forming between the mixed liquor tank of the first stage and the clarifier tank of the second stage. This stream of sludge, water and air or oxygen is subjected to the increased pressure created by the hydrostatic heads of water in the mixed liquor and clarifier tanks. Consequently, this stream may be saturated or supersaturated with dissolved oxygen. The dissolved oxygen maintains the sludge in the clarifier tank aerobic and ensures that the effluent water to the subsequent tertiary treatment section includes at least three, preferably at least five, parts of dissolved oxygen per million parts of water. We also may inject oxygen either in air or pure form under pressure into the sludge and water streams flowing between the second and third stages and the third and fourth stages of the activated sludge process. Consequently, the sludge in the thickener and digester can be retained for a longer period of time. This aged sludge from the thickener and digester is recycled to the first stage or mixed liquor 54 tank either directly or preferably by mixing with the stream of sludge and water flowing between the first and second stages.

TERTIARY TREATMENT

In our process, the effluent from the clarifier or second stage of the activated sludge process is filtered to remove biological solids in the effluent and then may be contacted with activated carbon to remove odor causing and other residual trace components by adsorption. Chemical agents may be added to the clarifier effluent to destabilize colloidal suspensions and assist filtration. However, because of the interstage aeration, the water has at least three, preferably at least five parts of dissolved oxygen per million parts of water and consequently organisms collected in the filter and on the carbon are maintained in an aerobic condition, avoiding odor and any degradation in quality of the filtered effluent. Further, the effluent water to the receiving stream has a high level of oxygen in it. Thus, it does not contribute to deterioration of the water quality of the receiving stream.

DETAILED DESCRIPTION

A waste water treating facility 10 embodying our improved process is schematically illustrated in the attached FIGURE.

This treating facility is described respecting a petroleum-chemical waste stream but the very same technology is applicable to municipal waste treatment and combined municipal/industrial waste treatment.

Typical contaminant water is the waste water from an oil refinery and waste water from a chemical plant. Table I below illustrates common characteristics of oil refinery waste water and Table II below illustrates common characteristics of waste water from a chemical plant.

TABLE I
REFINERY WASTE WATER CHARACTERISTICS AFTER PRIMARY TREATMENT IN API SEPARATOR
Median Values for Class C Refineries (USA)

| Parameters | Concentration, mg/liter |
|---|---|
| Biochemical Oxygen Demand, 5-day | 163 |
| Chemical Oxygen Demand | 473 |
| Total Organic Carbon | 160 |
| Oil and Grease | 51 |
| Phenolics | 11 |
| Suspended Solids | 52 |
| Ammonia | 48 |
| Sulfide | 2 |

TABLE II
SOME CHEMICAL PLANT WASTE WATER CHARACTERISTICS AFTER IMPLANT PRETREATMENT

| Parameters | Concentration Range, mg/liter |
|---|---|
| Biochemical Oxygen Demand, 5-day | 50–5000 |
| Chemical Oxygen Demand | 500–20,000 |
| Suspended Solids | 30–100 |
| Ammonia | 50–250 |

As shown in the FIGURE, the oil refining and chemical plant water waters are mixed together in the first compartment 29 of a multiple compartment equalization basin 12. The effluent from this basin 12 flows through valved lines 13 and 14 into a bank of pressure filters 16 and through a head tank 18 into a biological treatment plant 20. The oil refinery waste water first flows into a sump 22 and then into a conventional API separator 24 where gross amounts of oil and solids are removed. Under normal conditions, the treatment facility 10 can handle a maximum design quantity of water per day. For example, a large facility may have a capacity of 25,000,000 gallons of water per day. Heavy rain storms, could, however, overload this facility. Consequently, a compartmented surge basin 26 is provided for holding abnormally large quantities of water, and as will be explained in detail below, for storing shock loads of contaminants such as acids or alkalis. A pump 28 forwards any excess water from the sump 22 to this surge basin 26.

In accordance with one feature of our invention, the concentration of contaminants in the water flowing to the downstream biological treating plant 20 is controlled so that variations in contaminant levels are equalized. The equalization basin 12 serves to level out or equalize contaminant concentration by passing the waste water through three separate compartments 29, 30 and 31 in the basin 12. When a sharp increase in the noxious contaminant is experienced in the influent to the basin 12, the initial effluent concentration from the third compartment 31 is lower and changes at a rate less than from a single compartment basin. This provides time for acclimation of the micro-organisms in the biological treating plant 20.

Any sharp increase in contaminant concentration or any drastic change in the type of contaminants entering basin 12 has the greatest and most immediate impact on water quality conditions in compartment 29. When water from this first compartment 29 is mixed with the body of water in the second compartment 30, contaminant concentration is reduced. When the water from the second compartment 30 is mixed with the body of water in the third compartment 31, contaminant concentration is substantially reduced again. Mixing the water in this manner tends to dilute the contaminants so that their initial effluent concentration from the third compartment 31 is lower than if a single basin is used. Thus, if a slug of contaminants flows into the first compartment 29, this slug would be blended gradually in the quantities of water in the second and third compartments 30 and 31, be diluted and therefore initially would not increase or otherwise change the contaminant concentration or character by any substantial amount in the third compartment 31. As a consequence, the micro-organisms in the downstream biological treating plant 20 acclimate to the slow exposure of the changes in contaminant concentration or character and adapt to biologically degrade this higher concentration of contaminants or different character of contaminants.

In accordance with another feature of our invention, we maintain at a minimum the average time the water is retained in the equalization basin 12. Thus, the heat in the water is retained at a maximum. High heat in water fosters increased biodegradation of contaminants in the treating plant 20. Average water temperature entering the plant 20 preferably ranges between 90° and 100° F.

The water in the first compartment 29 is monitored to determine the presence of especially noxious contaminants, for example, ammonia, phenolics, sulfides, acids, caustics, etc., so that their source may be traced and corrective action taken. In the second compartment 30 pH is controlled by addition of acids or alkalis so that it is in the range of about 6.5 to 9.5 but preferably from about 7.5 to 8.5 when air oxidation of contaminants is required. This pH range is optimal for the oxidation reactions to occur and when desired the reactions are accelerated by adding hydroquinone or gallic acids.

Conventional floating aerators (not shown) float on the surface of the water in each compartment 29 through 31 and introduce air into the water to aerate and thoroughly mix the waste water. Such aerators (not shown) in compartment 30 mix and aerate to maintain dissolved oxygen levels in the preferred range of 3 mg $O_2$/liter or greater. The preferred ratio of the aerators is 0.2 horsepower aeration or more per 1000 gallons compartment volume.

If for any reason the equalization pond 12 is flooded with an extremely high concentration of contaminant beyond handling capability, for example, if a line carrying acid broke, a valve 34 in a recycle line 36 is opened and the valve 38 in the filter inlet line 14 is closed. A pump 40 then pumps this highly acidic water to the shock load compartment 26a of a surge basin 26 where it is retained and gradually reintroduced into the first compartment 29 of the basin 12 through a valved line 42. This protects the downstream biological treating plant 20 from being poisoned by shock loads of contaminants.

The mixing, aeration, pH control, chemical reactions, etc., taking place in equalization basin 12 causes coagulation and flotation of considerable contaminant matter. This matter is skimmed from the surface of the basin 12. Conventional slotted skim pipe (not shown) at the surface of the water in compartment 31 may be used.

The effluent from the final compartment 31 contains colloidal matter to which coagulants or flocculants such as aluminum or iron salts, and/or high molecular weight organic polyelectrolytes are added. The coagulants or flocculants destabilize, for removal by filtration, the colloidal particles which are carried by the effluent from the basin 12 to the bank of filters 16. The filtered water passing into the head tank 18 is lifted by the pump 40. The preferred filter medium used in the bank of filters 16 is sand or a combination of sand and coal. It is important that the water flowing to the downstream biological treating plant 20 be filtered to reduce suspended solids and oil to levels which do not interfere with the process. Under most conditions, the water flowing into the biological treating plant 20 preferably must contain no more than ten parts of hydrocarbons, such as oil and grease, per million parts of water and no more than 10 parts of oily suspended solids per million parts of water. Periodically, a filter unit in the bank of filters 16 must be backwashed. This is achieved by closing a valve in the feed line to the filter unit being backwashed and opening a valve in a backwash waste line (not shown) such that the effluents from the onstream filters are used for backwash water. One function of the head tank 18 is to provide a constant back pressure on the filtered water thereby providing a constant pressure backwash water source. The back wash water washes out the solids trapped in the filters, carrying them with the water into a sludge surge basin (not shown).

The biological treating plant 20 has four process stages. A contact stage 44 where the contaminated water contacts a biologically active sludge 46. A clarifier stage 48 where sludge is separated from decontaminated water. A thickening stage 50 where separated sludge is thickened to remove excess water. And a digestion stage 52 where thickened sludge is digested. In the first stage 44 water essentially free of solid and oily matter contacts the activated sludge mass 46 in a contact tank 54 called a mixed liquor tank. This sludge 46 includes micro-organisms which feed on the contaminants in the water. The metabolic processes of the micro-organisms convert the contaminants to cellular structure of the organisms, carbon dioxide, and various intermediate products. In the second stage 48, water and activated sludge from the mixed liquor tank 54 flow into a clarifier tank 56 via a line 72. As will be explained further below, activated sludge from a second source is added to line 72 via line 100 and the combined sludges and water flow to clarifier tank 56. The line 72 and an isolated zone 84 of the clarifier tank 56 provide for contact of the second activated sludge recycle component and the residual contaminants in the water leaving the mixed liquor tank 54. This results in further purification of the water. Water is separated from these sludge particles by allowing the sludge particles 46 to settle on the bottom of the clarifier tank 56. Decontaminated water flows from the top of the clarifier through a second bank of filters 58 into a receiving stream 60, preferably through a bed of activated carbon 66 for removal of trace soluble contaminants before discharge to the receiving stream.

In the third stage 50, the sludge 46 withdrawn from the bottom of the clarifier tank 56 is concentrated and the bulk of any water retained by the sludge is separated and withdrawn. In the fourth stage 52, thickened sludge is held in a tank 62 for a period of time sufficient to allow the micro-organisms to metabolize stored food material. This digested sludge is then spread over land and permitted to decompose and serve as a fertilizer. Alternately, the sludge can be incinerated.

In accordance with our invention, interstage aeration is provided to aerate the water as it flows into the biological treating plant 20 and between the four stages of the plant 20. The most important interstage aeration is the aeration of the streams of water and sludge flowing in lines 72 and 74 between first and second stages 44 and 48. Because of this aeration, the water leaving the clarifier tank and being discharged into a receiving body of water contains at least about three, preferably about five parts of dissolved oxygen per million parts of water. This is highly desirable especially when carbon adsorption is employed. The oxygen in the discharged water from the clarifier tank 56 maintains any microorganisms trapped in the filter 58 or following carbon bed aerobic. If there is insufficient air in this discharge water, the micro-organisms trapped in the filter go anaerobic producing hydrogen sulfide which would contaminate the discharged water. In addition, the dissolved oxygen in the water in the clarifier tank 56 maintains the sludge 46 on the bottom of this tank aerobic, permitting the sludge to be retained in the thickener 50 and clarifier 48 longer than conventional. This provides more effective thickener and clarifier operation.

We achieve interstage aeration by aspirating air into water flowing between tanks or positively injecting pressurized air into the transfer line. In addition to backwashing the bank of filters 16, the head of the water in the tank 18 can be utilized advantageously to aspirate air into the water flowing into the mixed liquor tank 54. The water level in the head tank 18 is above the water level of the mixed liquor tank 54. Water thus flows from the top of the head tank 18 downwardly through a line 64 and along a long generally horizontal line 66 which turns upwardly into a line 68 leading into the center of the mixed liquor tank 54. The horizontal line 66 is either at ground level or preferably below ground level to maximize the hydrostatic pressure. Thus, the air aspirated into the water is subjected to high pressure due to the water standing in the head and mixed liquor tanks 18 and 54. The horizontal line 66 can have a larger diameter than the downwardly extending line 64 or purposely be extended by looping, for example, so that the dwell time of the water and air mix can be extended. This substantially saturates or even supersaturates with respect to atmospheric pressure the water entering the mixed liquor tank 54 with dissolved oxygen. Normally this water flowing into the mixed liquor tank 54 will contain at least about 6 to 8 parts of dissolved oxygen per million parts of water and may reach levels above saturation of about 12 parts of dissolved oxygen per million parts of water. In a similar manner, air is aspirated or pressured into the water flowing from the mixed liquor tank 54 into the clarifier tank 56. The vertical line 72 transfers the water and suspended sludge particles downwardly to the horizontal line 74 which turns upward into a line 76 terminating near the surface of the clarifier tank 56. An aspirator 78 sucks air into the downward flowing water in the line 72. The water elevation in the tanks 54 and 56 subject the air-water mixture to high pressure as it flows through the line 74. This can saturate or supersaturate the water with dissolved oxygen.

The clarifier tank 56 is designed to receive the water from the upwardly extending line 76 into a confined mixing region formed by cylindrical baffle 82 concentric with the side walls of the tank. The diameter of cylindrical baffle 82 is preferably about ½ the diameter of the clarifier 56 and extending to about six feet from the bottom. Line 76 upwardly extends to well within the circular baffle 82 and, as the air-water mix exits line 76, the air lift pumping action creates a turbulent zone 84 in the center of the clarifier tank 56 that provides for further activated sludge-water contact, oxygen transfer and flocculation. The preferred contact time in line 76 and turbulent zone 84 is at least 20 minutes. The clarifier tank 56 includes weirs 80 at the top of the tank that maintains the water level and provides for discharge of clarified water from the quiescent zone 86. Activated sludge particles settle to the bottom of the tank where they are withdrawn by a conveyor and pump 88 system.

In our process, air under pressure from sources 90 and 92 is injected into the sludge flowing between the clarifier tank 56 and thickener 50 and between the thickener 50 and the digester 52. This high pressure aeration of sludge permits the sludge to be maintained in the clarifier tank 56 and thickener 50 for periods in excess of what is normally considered feasible in the activated sludge process. For example, the activated sludge-water mass in the feed to the thickener and clarifier in the normal system contains 1 mg $O_2$/liter or less. As the sludge blanket settles the dissolved oxygen in the interstitial water is rapidly depleted by the respiration of the micro-organisms and the facultative organisms start to remove oxygen from the nitrogen and sulfur compounds present in the water. This released hydrogen sulfide and nitrogen gas upsets the sludge settling process and seriously degrades water quality. In our process about ten times the dissolved oxygen concentration can be provided compared to conventional practice. This greatly decreases the rate at which septicity occurs and alleviates substantially the problems associated with retaining the sludge in the clarifier and thickener until the excess water is substantially removed.

Another aspect of our invention relates to the use of sludges with different properties recycled to different points to achieve different functions, all in a single activated sludge plant 20. As conventional, sludge withdrawn from the clarifier tank 56 is recycled through valved branched line 94 into the mixed liquor tank 54 with excess sludge to the thickener 50. A portion of this recycled sludge is introduced through branch 96 into the sludge-water mix flowing between the mixed liquor tank 54 and the clarifier 56. This absorptive sludge portion entering via line 96 has capacity to absorb and store residual soluble contaminants and improve the flocculating properties of the total sludge mass for improved separation in clarifier 56. The interstage aeration and clarifier design provides for contact time, mixing and aeration to optimize the capacity of this system. Similarly, the recycle sludge could be routed through the thickener 50 and via line 98 into the sludge-water mix flowing between the mixed liquor tank 54 and the clarifier tank 56. Sludge from the thickener 50 has been without food longer and therefore has greater absorptive and storage capacity and is contained in a reduced volume because of the dewatering action of the thickener. Maintaining the thickener sludge aerobic using interstage aeration is conducive to maintenance of sludge quality for recycle from the thickener 50. Another source in our process of the recycle sludge is obtained by routing that sludge through the thickener 50, the aerobic digester 52, and the valved line 100 into the sludge-water mix flowing in lines 72 and 74 between the mixed liquor tank 54 and the clarifier tank 56. The sludge component from the aerobic digester 52 has had typically one to four weeks to acclimate the residual refractory substrate contaminants. This acclimated sludge is especially effective for absorbing and biodegrading the residual substrate in the water exiting mixed liquor tank 54. When the combined sludge mass enters clarifier 56, the acclimated sludge combines with sludge in the clarifier tank 56 and seeds the sludge being recycled to the mixed liquor tank 54 via line 94. Seeding the main recycle sludge mass continuously with sludge acclimated to residual, refractory materials shifts the equilibrium to increase removal of these contaminants by the main sludge mass in the mixed liquor tank 54. After equilibrium is attained there is no longer high concentrations of refractory substrate in the water leaving the clarifier tank 54. Introduction of any new refractory materials into the system causes the rapid development of acclimated organisms.

As evident to those skilled in the art, modifications can be made in our process without departing from the principles of our invention claimed herein. For example, oxygen may be substituted for air in the interstage aeration system.

We claim:

1. In the activated sludge process wherein a first stage contaminated water containing less than about 20 ppm of hydrocarbons and less than about 20 ppm of solids is contacted with activated sludge for a period of time sufficient to biologically degrade contaminents in the water and in a second stage decontaminated water is separated from the activated sludge, a first portion of said separated sludge being recycled for recontact with the water in the first stage and a second portion of said separated sludge being treated in downstream operations, the improvement comprising:

introducing oxygen into the water and sludge mix entering the second stage so that the sludge in the second zone is maintained in an aerobic state and separated decontaminated water from said second stage contains at least about 3 parts of dissolved oxygen per million parts of water.

2. The improved process of claim 1 wherein the contaminated water entering the first stage contains less than about 10 ppm of hydrocarbons and less than about 10 ppm of solids.

3. The improved process of claim 1 wherein the separated decontaminated water from said stage contains at least about 5 parts of dissolved oxygen per million parts of water.

4. The improved process of claim 1 wherein municipal waste water is subjected to treatment.

5. The improved process of claim 1 wherein waste water from petroleum processing and/or chemical processing is subjected to treatment.

6. The improved process of claim 1 where the oxygen is introduced into the water and sludge mix entering the second stage by aspirating air into a stream of the water and sludge mix flowing between the first and second stages.

7. The improved process of claim 6 where the oxygen in the stream of water and sludge mix flowing between the first and second stage is subjected to a high pressure produced by hydrostatic heads of liquid in the first and second stages.

8. The improved process of claim 1 where the average age of the activated sludge in the first and second stages exceeds ten days.

9. The improved process of claim 1 where a part of the first portion of the separated recycled sludge is mixed with the stream of water and sludge mix flowing between the first and second stages.

10. The improved process of claim 1 where said second portion of the sludge treated in downstream operations is forwarded through a third stage for thickening, and the thickened sludge from the third stage is forwarded to a fourth stage for digestion.

11. The improved process of claim 10 where a portion of the thickened sludge from the third stage is mixed with the water and sludge mix entering the second stage.

12. The improved process of claim 10 where a portion of the digested sludge from the fourth stage is mixed with the water and sludge mix entering the second stage.

13. The improved process of claim 1 where oxygen is introduced into the contaminated water entering the first stage by aspirating air into a stream of said water.

14. The improved process of claim 13 where the oxygen in the stream of water entering the first stage is subjected to high pressure produced by a hydrostatic head of liquor.

15. The improved process of claim 10 where oxygen is introduced into the sludge flowing between the second and third stages, and between the third and fourth stages.

16. A method of pretreating waste water including from about 25 to about 150 parts per million of solids per million parts of water and/or from about 25 to about 300 parts of hydrocarbons per million parts of water upstream of activated sludge treatment comprising, passing the water through an equalization zone including at least two separate water retention compartments in series so that the water is mixed in each compartment and flows from one compartment to the next compartment and a given quantity of water is retained for predetermined period in each of said compartments.

introducing air into the water in at least one of the compartments so that the water in the compartment is vigorously agitated and the effluent in the aerated compartment includes at least three parts of dissolved oxygen per million parts of water, adjusting the pH of the water in the equalization zone so that the pH of the water in one of the compartments and in the effluent from said zone ranges between about 6.5 and about 9.5, destabilizing colloidal particles suspended in the water, and filtering the effluent water from the equalization zone so that said filtered water includes no more than about twenty parts of hydrocarbons per million parts of water and no more than about twenty parts of suspended solids per million parts of water.

17. The method of claim 16 wherein municipal waste water is subjected to treatment.

18. The method of claim 16 wherein waste water from petroleum processing and/or chemical processing is subjected to treatment.

19. The method of claim 16 wherein said filtered water includes no more than about ten parts of hydrocarbons per million parts of water and no more than about ten parts of suspended solids per million parts of water.

20. The process of claim 16 where the difference in temperature between the influent water entering the equalization zone and the effluent water exiting the equalization zone is less than about 20° F wherein the total retention time in the equalization zone ranges from about 2 to 15 hours.

21. The process of claim 16 where any solid or liquid material floating on the water surface in the equalization zone is removed by skimming.

22. The process of claim 16 where a coagulant or flocculant is added to the water to destabilize the colloidal particles in the water.

23. The process of claim 16 where the water in the first compartment is monitored to detect any rapid change in contaminant concentration.

24. The process of claim 16 where gallic acid or hydroquinone is added to the water in the aerated compartment to accelerate the rate of immediate oxygen demand removal.

25. A continuous process for purifying contaminated water including solids and/or hydrocarbons, comprising:
  (a) passing the water through an equalization zone where the pH of the water is adjusted to a range from about 6.5 to 9.5 and the contaminated water is distributed in a larger body of water so that the changes in concentration of contaminants in the effluent water to the equalization zone will produce gradual changes in concentration of contaminants in effluent water from said zone,
  (b) aerating the water in the equalization zone so that the dissolved oxygen in the water is at least about three parts of dissolved oxygen per million parts of water,
  (c) adding a destabilizing agent to the water so that colloidal particles in the water aggregate,
  (d) passing the water from the equalization zone through a filter so that particles and hydrocarbons removed therefrom and the effluent from the filter will have less than about twenty parts of suspended solids per million parts of water and less than about twenty parts of hydrocarbons per million parts of water,
  (e) passing effluent from the filter through a multi-stage biological treating zone having a first stage where the water flows into a contact zone and contacts an activated sludge which decontaminates the water by biodegradation of contaminants, a second stage where the water from the first stage is clarified to separate suspended sludge particles from decontaminated water, a portion of said separated sludge particles being recycled to the first stage and the bulk of the clarified decontaminated water being withdrawn from the second stage, a third stage where that portion of the separated sludge particles not recycled are concentrated by removing the bulk of the residual water therefrom, and a fourth stage where said concentrated sludge particles are digested.

(f) aspirating air into the water and sludge mix as it flows between the first and second stages, so that the sludge in the second stage is maintained in an aerobic stage and clarified water from said second stage contains at least about three parts of dissolved oxygen per million parts of water, and (g) filtering separated water withdrawn from the second stage to remove minute suspended sludge particles not separated from this water in said second stage.

26. The process of claim 25 wherein the effluent water from the equalization zone passing through the filter has less than about ten parts of suspended solids per million parts of water and less than about ten parts of hydrocarbons per million parts of water.

27. The process of claim 25 wherein the clarified water from the second stage contains at least about five parts of dissolved oxygen per million parts of water.

28. The process of claim 25 wherein municipal waste water is subjected to treatment.

29. The process of claim 25 wherein waste water from petroleum processing and/or chemical processing is subjected to treatment.

30. The process of claim 25 including the additional steps of aerating the water entering the first stage and aerating the sludge particle mix as it flows between the second, third and fourth stages.

31. The process of claim 25 where the filtered water from step (g) is contacted with activated carbon.

32. The process of claim 25 where a portion of the sludge from the second stage is mixed with the water and sludge flowing between the first and second stages.

33. The process of claim 25 where a portion of the sludge from the third stage is mixed with the water and sludge flowing between the first and second stages.

34. The process of claim 25 where a portion of the sludge from the fourth stage is mixed with the water and sludge flowing between the first and second stages.

35. The process of claim 25 where the average age of the activated sludge in the biological zone is greater than ten days.

36. The process of claim 25 where the dissolved oxygen concentration in the water flowing to the biological treating zone is at least about three parts of dissolved oxygen per million parts of water.

37. The process of claim 25 where the air, water, and sludge mix entering the second stage of the biological treating zone is confined in a zone of high turbulence.

38. An improved multiple-stage activated sludge process wherein the average age of the activated sludge in the biological zone exceeds ten days comprising
pretreating the contaminated water so that it contains no more than about 20 parts of hydrocarbons per million parts of water and no more than about 20 parts of suspended solids per million parts of water,
contacting said pretreated water with activated sludge in the first stage for a period of time sufficient to biologically degrade contaminants in the water,
introducing oxygen into the water and sludge mix entering the second stage so that the sludge in the second stage is maintained in an aerobic state and separated decontaminated water from said second stage contains at least about 5 ppm dissolved oxygen.
separated decontaminated water from the activated sludge in the second stage and recycling a first portion of said separated sludge for recontact with the water in the first stage, and
treating a second portion of said separated sludge in downstream operations.

39. The process of claim 38 wherein the contaminated water is pretreated so that it contains no more than ten parts of hydrocarbon per million parts of water and/or no more than ten parts of suspended solids per million parts of water.

40. The improved process of claim 38 wherein oxygen is introduced into the water and sludge mix entering the second state so that the sludge in said second stage is maintained in an aerobic stage.

41. In the activated sludge process wherein a first stage contaminated water is contacted with activated sludge for a period of time sufficient to biologically degrade contaminants in the water and in a second stage decontaminated water is separated from the activated sludge, a first portion of said separated sludge being recycled for recontact with the water in the first stage and a second portion of said separated sludge being treated in downstream operations, the improvement comprising:
reducing the level of contaminants in the contaminated water to the first stage to less than about 20 ppm of hydrocarbons and less than about 20 ppm of solids; and
introducing oxygen into the water and sludge mix entering the second stage so that the sludge in the second zone is maintained in an aerobic state and separated decontaminated water from said second stage contains at least about 3 parts of dissolved oxygen per million parts of water.

42. The improved process of claim 41 wherein the contaminated water entering the first stage contains less than about 10 ppm of hydrocarbons and less than about 10 ppm of solids.

43. In a multi-stage activated sludge process wherein a first stage contaminated water is contacted with activated sludge for a period of time to biologically contaminants in the water and in a second stage decontaminated water from the first stage is separated from the activated sludge, the improvement comprising filtering the contaminated water prior to the first stage to reduce the level of oil and grease, and solids so that the waste water to the first stage has less than about 20 ppm of oil and grease and less than about 20 ppm of solids.

44. The process of claim 43 wherein a first portion of said separated sludge is recycled for recontact with the water in the first stage and a second portion of said separated sludge is treated in downstream operations.

45. In a multi-stage activated sludge process wherein a first stage contaminated water is contacted with activated sludge for a period of time to biologically degrade contaminants in the water and in a second stage decontaminated water is separated from the activated sludge, the improvement comprising reducing the oil and grease, and solids content of the waste water to less than about 20 ppm oil and grease and less than about 20 ppm solids, prior to the first stage.

46. The process of claim 45 wherein the oil and grease, and solids content are reduced to less than about 10 ppm each.

47. In an activated sludge process wherein a first stage contaminated water is contacted with activated sludge for a period of time to biologically degrade contaminants in the water and in a second stage decontaminated water from the first stage is separated from the activated sludge, the improvement comprising maintaining the average sludge age in the first and second stages in excess of about ten days and treating the waste water to reduce oil and grease, and solids to less than about 20 ppm oil and grease and less than about 20 ppm solids, prior to the first stage.

48. In the activated sludge process wherein a first stage contaminated water containing less than about 10 ppm of hydrocarbons and less than about 10 ppm of solids is contacted with activated sludge for a period of time sufficient to biologically degrade contaminants in the water and in a second stage decontaminated water is separated from the activated sludge, a first portion of said separated sludge being recycled for recontact with the water in the first stage and a second portion of said separated sludge being treated in downstream operations, the improvement comprising
 introducing oxygen into the water and sludge mix entering the second stage so that the sludge in the second zone is maintained in an aerobic state and separated decontaminated water from said second stage contains at least about 5 parts of dissolved oxygen per million parts of water.

49. The improved process of claim 48 where the oxgyen is introduced into the water and sludge mix entering the second stage by aspirating air into a stream of the water and sludge mix flowing between the first and second stages.

50. The improved process of claim 49 where the oxygen in the stream of water and sludge mix flowing between the first and second stage is subjected to a high pressure produced by hydrostatic heads of liquid in the first and second stages.

51. The improved process of claim 48 where the average age of the activated sludge in the first and second stages exceeds ten days.

52. The improved process of claim 48 where a part of the first portion of the separated recycled sludge is mixed with the stream of water and sludge mix flowing between the first and second stages.

53. The improved process of claim 48 where said second portion of the sludge treated in downstream operations is forwarded through a third stage for thickening, and the thickened sludge from the third stage is forwarded to a fourth stage for digestion.

54. The improved process of claim 53 where a portion of the thickened sludge from the third stage is mixed with the water and sludge mix entering the second stage.

55. The improved process of claim 53 where a portion of the digested sludge from the fourth stage is mixed with the water and sludge mix entering the second stage.

56. The improved process of claim 48 where oxygen is introduced into the contaminated water entering the first stage by aspirating air into a stream of said water.

57. The improved process of claim 56 where the oxygen in the stream of water entering the first stage is subjected to high pressure produced by a hydrostatic head of liquid.

58. The improved process of claim 53 where oxygen is introduced into the sludge flowing between the second and third stages, and between the third and fourth stages.

59. A method of pretreating waste water including from about 25 to about 150 parts per million of solids per million parts of water and from about 25 to about 300 parts of hydrocarbons per million parts of water upstream of activated sludge treatment comprising, passing the water through an equalization zone including at least two separate water retention compartments in series so that the water is mixed in each compartment and flows from one compartment to the next compartment and a given quantity of water is retained for predetermined period in each of said compartments,
 introducing air into the water in at least one of the compartments so that the water in the compartment is vigorously agitated and the effluent in the aerated compartment includes at least three parts of dissolved oxygen per million parts of water,
 adjusting the pH of the water in the equalization zone so that the pH of the water in one of the compartments and in the effluent from said zone ranges between about 6.5 and about 9.5,
 destabilizing colloidal particles suspended in the water, and
 filtering the effluent water from the equalization zone so that said filtered water includes no more than ten parts of hydrocarbons per million parts of water and no more than ten parts of solids per million parts of water.

60. The process of claim 59 where the difference in temperature between the influent water entering the equalization zone and the effluent water exiting the equalization zone is less than about 20° F wherein the total retention time in the equalization zone ranges from about 2 to 15 hours.

61. The process of claim 59 where any solid material floating on the water surface in the equalization zone is removed by skimming.

62. The process of claim 59 where a coagulant or flocculant is added to the water to destabilize the colloidal particles in the water.

63. The process of claim 59 where the water in the first compartment is monitored to detect any rapid change in contaminant concentration.

64. The process of claim 59 where gallic acid or hydroquinone is added to the water in the aerated compartment to accelerate the rate of immediate oxygen demand removal.

65. A continuous process for purifying contaminated water including solids and hydrocarbons, comprising
 (a) passing the water through an equalization zone where the pH of the water is adjusted to a range from about 6.5 to 9.5 and the contaminated water is distributed in a larger body of water so that the changes in concentration of contaminants in the effluent water to the equalization zone will produce gradual changes in concentration of contaminants is efffluent water from said zone,
 (b) aerating the water in the equalization zone so that the dissolved oxygen in the water is at least about three parts of dissolved oxygen per million parts of water, (c) adding a destabilizing agent to the water so that colloidal particles in the water aggregate, (d) passing the water from the equalization zone through a filter so that particles and hydrocarbons removed therefrom and the effluent from the filter will have less than about ten parts of suspended solids per million parts of water and less than about ten parts of hydrocarbons per million parts of water, (e) passing effluent from the filter through a multi-stage biological treating zone having a first stage where the water flows into a contact zone and contacts an activated sludge which decontaminates the water by biodegradation of contaminants, a second stage where the water from the first stage is clarified to separate suspended sludge particles from decontaminated water, a porton of said separated sludge particles being recycled to the first stage and the bulk of the clarified decontaminated water being withdrawn from the second stage, a third stage where that portion of the separated sludge particles not recycled are concentrated by removing the bulk of the residual water therefrom, and a fourth stage where said concentrated sludge particles are digested, (f) aspirating air into the water and sludge mix as it flows between the first and second stages, so that the sludge in the second stage is maintained in an aerobic state and clarified water from said second stage contains at least about five parts of dissolved oxygen per million parts of water, and (g) filtering separated water withdrawn from the second stage to remove minute suspended sludge particles not separated from this water in said second stage.

66. The process of claim 65 including the additional steps of aerating the water entering the first stage and aerating the sludge particle mix as it flows between the second, third and fourth stages.

67. The process of claim 65 where the filtered water from step (g) is contacted with activated carbon.

68. The process of claim 65 where a portion of the sludge from the second stage is mixed with the water and sludge flowing between the first and second stages.

69. The process of claim 65 where a portion of the sludge from the third stage is mixed with the water and sludge flowing between the first and second stages.

70. The process of claim 65 where a portion of the sludge from the fourth stage is mixed with the water and sludge flowing between the first and second stages.

71. The process of claim 65 where the average age of the activated sludge in the first stage is greater than ten days.

72. The process of claim 65 where the dissolved oxygen concentration in the water flowing to the biological treating zone is at least about three parts of dissolved oxygen per million parts of water.

73. The process of claim 65 where the air, water, and sludge mix entering the second stage of the biological treating zone is confined in a zone of high turbulence.

74. An improved multiple-stage activated sludge process wherein the average age of the activated sludge in the first and second stages exceeds ten days comprising
   pretreating the contaminated water so that it contains no more than 10 parts of hydrocarbons per million parts of water and no more than 10 parts of solids per million parts of water,
   contacting said pretreated water with activated sludge in the first stage for a period of time sufficient to biologically degrade contaminants in the water,
   introducing oxygen into the water and sludge mix entering the second stage so that the sludge in the second stage is maintained in an aerobic stage and separated decontaminated water from said second stage contains at least 5 ppm dissolved oxygen,
   separating decontaminated water from the activated sludge in the second stage and recycling a first portion of said separated sludge for recontact with the water in the first stage, and
   treating a second portion of said separated sludge in downstream operations.

* * * * *

UNITED STATES PATENT OFFICE
CERTIFICATE OF CORRECTION

Patent No. 4,073,722                Dated February 14, 1978

Inventor(s) JAMES F. GRUTSCH, RUSSELL C. MALLATT, and BENJAMIN F. STEELY

It is certified that error appears in the above-identified patent and that said Letters Patent are hereby corrected as shown below:

| | | | |
|---|---|---|---|
| Column 4, | line 46 | "water forming" should be -- water flowing -- | |
| " 5 | " 61 | "biological treatment" should be -- biological treating -- | |
| " 11 | " 4 | "said stage" should be -- said second stage -- | |
| " 11 | " 63 | "said compartments." should be -- said compartments, -- | |
| " 14 | " 24 | "state" should be -- stage -- | |
| " 14 | " 25 | "stage" should be -- state -- | |
| " 14 | " 52-53 | "biologically contaminants" should be -- biologically degrade contaminants -- | |
| " 16 | " 63-64 | "contaminants is" should be -- contaminants in -- | |
| " 18 | " 33 | "aerobic stage" should be -- aerobic state -- | |

Signed and Sealed this

Ninth Day of January 1979

[SEAL]

Attest:

RUTH C. MASON
Attesting Officer

DONALD W. BANNER
Commissioner of Patents and Trademarks